(12) United States Patent
Li et al.

(10) Patent No.: US 8,934,437 B2
(45) Date of Patent: Jan. 13, 2015

(54) APPARATUS AND METHOD TO ESTABLISH A DEVICE-TO-DEVICE (D2D) CONNECTION IN A 3GPP-LTE NETWORK USING A DISTRIBUTED CHANNEL SCAN

(71) Applicant: Intel Corporation, Santa Clara, CA (US)

(72) Inventors: Qinghua Li, San Ramon, CA (US); Honggang Li, Beijing (CN); Rui Huang, Beijing (CN); Yuan Zhu, Beijing (CN); Hujun Yin, Saratoga, CA (US); Yujian Zhang, Beijing (CN); Jong-Kae Fwu, Sunnyvale, CA (US); Rongzhen Yang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 43 days.

(21) Appl. No.: 13/751,644

(22) Filed: Jan. 28, 2013

(65) Prior Publication Data

US 2013/0301438 A1  Nov. 14, 2013

Related U.S. Application Data

(60) Provisional application No. 61/646,223, filed on May 11, 2012.

(51) Int. Cl.
*H04W 4/00* (2009.01)
*H04J 3/16* (2006.01)
(Continued)

(52) U.S. Cl.
CPC ................ *H04J 3/1694* (2013.01); *H04B 7/26* (2013.01); *H04W 24/10* (2013.01);
(Continued)

(58) Field of Classification Search
CPC ................ H04L 47/70; H04L 49/90
USPC ....... 370/230, 230.1, 231–234, 235, 370/252–253, 335–336, 342–343, 345, 437, 370/441–443, 465, 468, 478–480
See application file for complete search history.

(56) References Cited

U.S. PATENT DOCUMENTS

| 8,462,734 | B2 * | 6/2013 | Laine et al. ................ 370/331 |
| 8,509,105 | B2 * | 8/2013 | Kneckt et al. .............. 370/252 |

(Continued)

FOREIGN PATENT DOCUMENTS

| WO | WO-2011147462 A1 | 12/2011 |
| WO | WO-2013169699 A1 | 11/2013 |

OTHER PUBLICATIONS

International Application Serial No. PCT/US2013/039828, International Search Report mailed Sep. 23, 2013, 3 pgs.

(Continued)

*Primary Examiner* — Kevin Mew
(74) *Attorney, Agent, or Firm* — Schwegman Lundberg & Woessner, P.A.

(57) ABSTRACT

An apparatus and method that allow user equipment (UE) to transmit information directly with other user equipment, using a device-to-device (D2D) mode is disclosed herein. A first D2D UE (dUE1) that wishes so communicate to a second D2D UE (dUE2) in D2D mode makes various communications requests to an Evolved Node B (eNB), which can facilitate the connection between the dUE1 and the dUE2. Among these requests are to make the D2D connection via WiFi instead of via Long Term Evolution (LTE). The eNB determines the WiFi capabilities of dUE1 and dUE2, then assigns a subset of available channels to be scanned by dUE1 and a separate subset of available channels to be scanned by dUE2. Thereafter, the eNB can assign a WiFi channel based on the scans performed by dUE1 and dUE2.

25 Claims, 3 Drawing Sheets

(51) Int. Cl.
| | |
|---|---|
| H04B 7/26 | (2006.01) |
| H04W 24/10 | (2009.01) |
| H04W 72/04 | (2009.01) |
| H04W 72/08 | (2009.01) |
| H04W 36/00 | (2009.01) |
| H04J 3/00 | (2006.01) |
| H04B 1/56 | (2006.01) |
| H04W 56/00 | (2009.01) |
| H04W 52/02 | (2009.01) |
| H04W 76/02 | (2009.01) |
| H04W 4/22 | (2009.01) |
| H04W 36/22 | (2009.01) |
| H04B 15/00 | (2006.01) |
| H04B 7/02 | (2006.01) |
| H04B 7/04 | (2006.01) |
| H04B 7/06 | (2006.01) |
| H04W 24/02 | (2009.01) |
| H04W 72/12 | (2009.01) |
| H04L 29/02 | (2006.01) |
| H04W 4/06 | (2009.01) |
| H04W 48/20 | (2009.01) |
| H04W 88/06 | (2009.01) |
| H04W 76/04 | (2009.01) |
| H04W 72/02 | (2009.01) |
| H04W 16/14 | (2009.01) |

(52) U.S. Cl.
CPC ....... *H04W 72/0413* (2013.01); *H04W 72/085* (2013.01); *H04W 36/00* (2013.01); *H04J 3/00* (2013.01); *H04B 1/56* (2013.01); *H04W 56/00* (2013.01); *H04W 52/0235* (2013.01); *H04W 52/0212* (2013.01); *H04W 76/027* (2013.01); *H04W 72/042* (2013.01); *H04W 4/22* (2013.01); *H04W 36/22* (2013.01); *H04B 15/00* (2013.01); *H04W 72/082* (2013.01); *H04B 7/024* (2013.01); *H04B 7/0456* (2013.01); *H04B 7/063* (2013.01); *H04B 7/0632* (2013.01); *H04B 7/0639* (2013.01); *H04B 7/0647* (2013.01); *H04W 24/02* (2013.01); *H04W 72/1215* (2013.01); *H04L 29/02* (2013.01); *H04W 4/06* (2013.01); *H04W 48/20* (2013.01); *H04B 7/0473* (2013.01); *H04B 7/0486* (2013.01); *H04B 7/065* (2013.01); *H04W 88/06* (2013.01); *H04W 76/048* (2013.01); *H04W 72/02* (2013.01); *Y02B 60/50* (2013.01); *H04W 4/005* (2013.01); *H04W 16/14* (2013.01)
USPC .................... 370/329; 370/252; 370/465

(56) References Cited

U.S. PATENT DOCUMENTS

| | | | |
|---|---|---|---|
| 8,705,398 | B2* | 4/2014 | Koskela et al. ............ 370/252 |
| 2011/0268004 | A1 | 11/2011 | Doppler et al. |
| 2011/0275316 | A1 | 11/2011 | Suumaki et al. |
| 2011/0287794 | A1 | 11/2011 | Koskela et al. |
| 2012/0015607 | A1 | 1/2012 | Koskela et al. |
| 2012/0106517 | A1* | 5/2012 | Charbit et al. ............ 370/336 |
| 2012/0134344 | A1* | 5/2012 | Yu et al. .................... 370/336 |
| 2012/0281679 | A1* | 11/2012 | Fan et al. ................... 370/336 |
| 2013/0064103 | A1* | 3/2013 | Koskela et al. ............ 370/252 |
| 2013/0230032 | A1* | 9/2013 | Lu et al. .................... 370/336 |
| 2013/0288608 | A1* | 10/2013 | Fwu et al. .................. 455/63.1 |
| 2013/0294283 | A1* | 11/2013 | Van Phan et al. .......... 370/252 |
| 2014/0010209 | A1* | 1/2014 | Hakola et al. ............. 370/336 |
| 2014/0036876 | A1* | 2/2014 | Li et al. ..................... 370/336 |
| 2014/0243038 | A1* | 8/2014 | Schmidt et al. ........... 455/552.1 |

OTHER PUBLICATIONS

International Application Serial No. PCT/US2013/039828, Written Opinion mailed Sep. 23, 2013, 10 pgs.

* cited by examiner

US 8,934,437 B2

APPARATUS AND METHOD TO ESTABLISH A DEVICE-TO-DEVICE (D2D) CONNECTION IN A 3GPP-LTE NETWORK USING A DISTRIBUTED CHANNEL SCAN

RELATED APPLICATION

This application claims the benefit of priority under 35 U.S.C. 119(e) to U.S. Provisional Patent Application Ser. No. 61/646,223, filed on May 11, 2012, which is incorporated herein by reference in its entirety.

TECHNICAL FIELD

Embodiments pertain to wireless communications. Some embodiments pertain to wireless communications directly between two or more pieces of user equipment.

BACKGROUND ART

User Equipment (UE), including mobile devices such as phones, tablets, e-book readers, laptop computers, and the like, have become increasingly common. Accompanying the increase of usage of such devices has been an increase in the usage of proximity-based applications and services. Proximity-based applications and services are based on the awareness that two or more devices/users are close to one another and desire to communicate to each other. Exemplary proximity-based applications and services include social networking, mobile commerce, advertisement, gaming, and the like. In the current art, such applications and services use traditional mobile broadband networks. Such mobile broadband networks may not result in the best performance, for both the network and for the UE.

DESCRIPTION OF THE EMBODIMENTS

Figure 1:
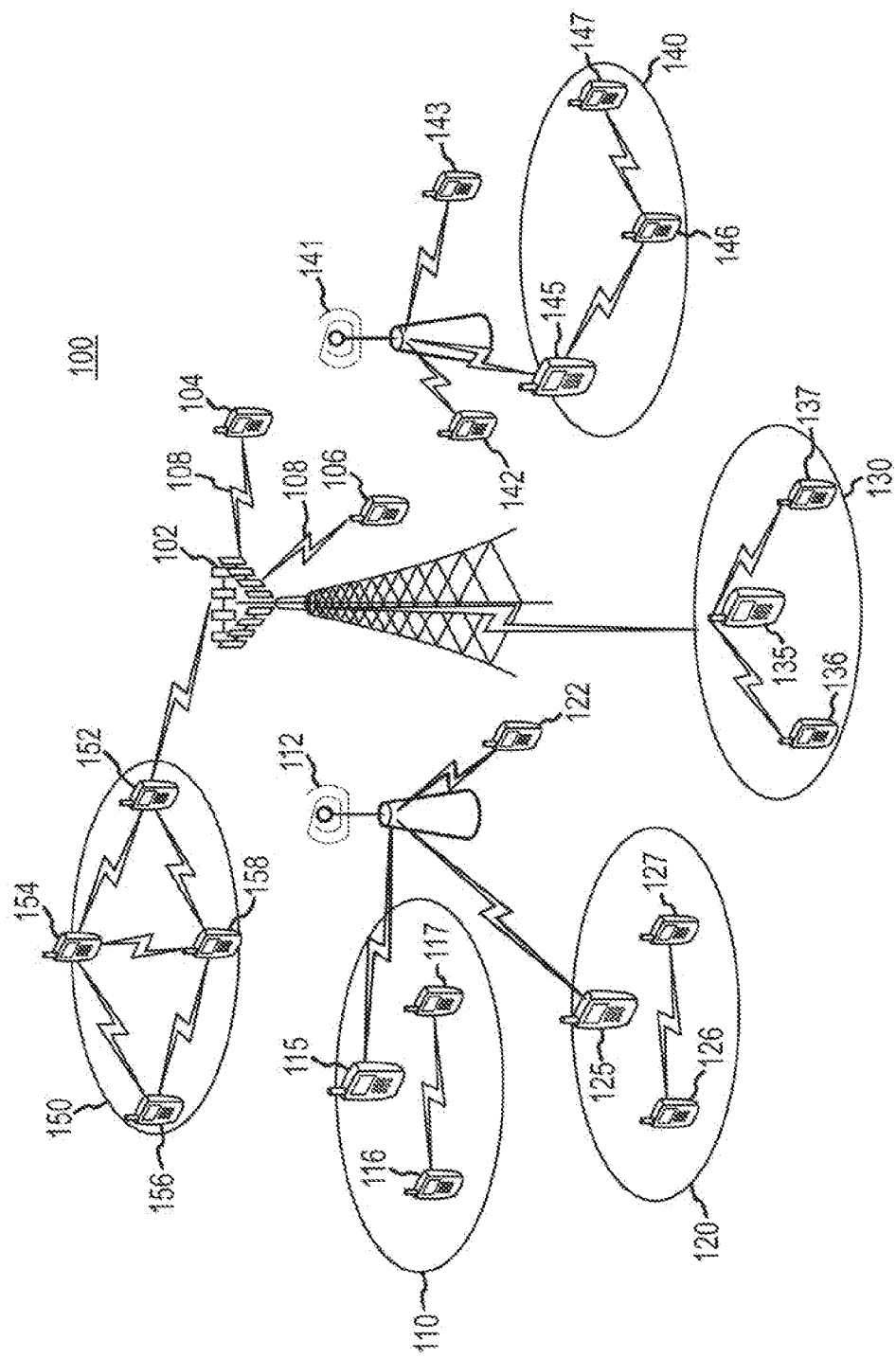
FIG. 1 is an illustrated overview of an embodiment of the present invention.

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

In the following detailed description, numerous specific details are set forth in order to provide a thorough understanding of the invention. However, it will be understood by those skilled in the art that the present invention may be practiced without these specific details. In other instances, well-known method, procedures, components, and circuits have not been described in detail so as not to obscure the present invention.

Although embodiments of the invention are not limited in this regard, the terms "plurality" and "a plurality" as used herein may include, for example, "multiple" or "two or more." The terms "plurality" or "a plurality" may be used throughout the specification to describe two or more components, devices, elements, units, parameters, and the like. For example, "a plurality of stations" may include two or more stations.

The 3rd Generation Partnership Project (3GPP) is a collaboration agreement established in December 1998 to bring together a number of telecommunications standards bodies, known as "Organizational Partners," that currently include the Association of Radio Industries and Business (ARIB), the China Communications Standards Association (CCSA), the European Telecommunications Standards Institute (ETSI), the Alliance for Telecommunications Industry Solutions (ATIS), the Telecommunications Technology Association (TTA), and the Telecommunication Technology Committee (TTC). The establishment of 3GPP was formalized in December 1998 by the signing of the "The 3rd Generation Partnership Project Agreement."

3GPP provides globally applicable standards as Technical Specifications and Technical Reports for a 3rd Generation Mobile System based on evolved GSM core networks and radio access technologies that they support (e.g., Universal Terrestrial Radio Access (UTRA) for both Frequency Division Duplex (FDD) and Time Division Duplex (TDD) modes). 3GPP also provides standards for maintenance and development of the Global System for Mobile communication (GSM) as Technical Specifications and Technical Reports including evolved radio access technologies (e.g., General Packet Radio Sendee (GPRS) and Enhanced Data rates for GSM Evolution (EDGE)). Technical Specifications for current standards related to mobile telephony are generally available to the public from the 3GPP organization.

3GPP is currently studying the evolution of the 3G Mobile System and considers contributions (views and proposals) directed toward the evolution of the UTRA Network (UTRAN). A set of high-level requirements was identified by 3GPP workshops including: reduced cost per bit; increased service provisioning (i.e., more sendees at lower cost with better quality); flexibility of use of existing and new frequency bands; simplified architecture with open interfaces; and reduced/reasonable terminal power consumption. A study on the UTRA & UTRAN Long Term Evolution (UTRAN-LTE, also known as 3GPP-LTE and E-UTRA) was started in December 2004 with the objective to develop a framework for the evolution of the 3GPP radio-access technology towards a high-data-rate, low-latency and packet-optimized radio-access technology. The study considered modifications to the radio-interface physical layer (downlink and uplink) such as means to support flexible transmission bandwidth up to 20 MHz, introduction of new transmission schemes, and advanced multi-antenna technologies. 3GPP-LTE is based on a radio-interface incorporating orthogonal frequency division multiplex (OFDM) techniques. OFDM is a digital multi-carrier modulation format that uses a large number of closely-spaced orthogonal sub-carriers to carry respective user data channels. Each sub-carrier is modulated with a conventional modulation scheme, such as quadrature amplitude modulation (QAM), at a (relatively) low symbol rate when compared to the radio frequency (RF) transmission rate. In practice, OFDM signals are generated using the fast Fourier transform (FFT) algorithm.

In an exemplary situation in which proximity-based applications are used, a user with a mobile device, or user equipment (UE1) becomes physically close to another mobile device, UE2. A user may wish to transfer files, play a game, or otherwise communicate to UE2 from UE1. The connection between UE1 and UE2 may be automatically initiated by an application, instead of initiated by a user. In a traditional communications network, such a communication commonly occurs through a central coordinator, such as a base transceiver station, a Node B, or an Evolved Node B (eNodeB or eNB).

However, there are several factors that may make proximity-based communication different. For example, the distance between devices is commonly small and the communication may be application-driven, rather than user-initiated (e.g., applications that automatically communicate wiien a second device running the same application is in proximity). There are aspects of such proximity-based communications that could be optimized.

FIG. 1 illustrates a system that combines a Device-to-Device ("D2D") network with a wireless access network, such as a Long Term Evolution (LTE) network. Mobile broadband network 100 includes a central coordinator, illustrated here as eNB 102. User equipment (UE) 104 and 106 communicate with eNB 102 via LTE communications channel 108.

Also illustrated in FIG. 1 are D2D clusters 110, 120, 130, 140, and 150. Each one of D2D clusters 110, 120, 130, 140, and 150 comprises a plurality of UEs that are capable of communicating directly with each other, without the need to communicate through eNB 102. This application will refer to a UE that has D2D capability as a dUE, to stand for D2D capable User Equipment. In FIG. 1, several different layouts of D2D clusters are shown. It should be understood that other configurations of D2D clusters are also possible. It should also be understood that a single eNB can support many more D2D clusters than are shown in FIG. 1.

Pico eNB 112 is coupled to eNB 102. Coupled to pico eNB 112 are D2D clusters 110 and 120. Within D2D cluster 110 is a D2D coordinator 115 and dUEs 116 and 117. D2D coordinator 115 serves to manage the communications between dUEs 116/117 and pico eNB 112. Within D2D cluster 120 is a D2D coordinator 125 and dUEs 126 and 127. Also coupled to pico eNB 112 is a UE 122, UE 122 is not coupled to D2D clusters 110 or 120. UE 122 may or may not have D2D capabilities.

dUEs 116 and 117 have a D2D connection with each other, where communications between dUE 116 and dUE 117 need not involve either pico eNB 112 or eNB 102. Instead, information is transmitted directly between dUE 116 and dUE 117. This set-up provides a variety of advantages. For example, because dUE 116 and dUE 117 are in close proximity to each other, they do not have to transmit data all the way to eNB 102-therefore, one or both devices can use a low-power transceiver mode, prolonging the battery lives of dUE 116 and dUE 117. In addition, because eNB 112 and eNB 102 are not involved in transmissions between dUE 116 and dUE 117, the finite bandwidth capabilities of eNB 102 and pico eNB 112 are not used. If either dUE116 or dUE 117 needs to communicate to eNB 102 or pico eNB 112, such a communication occurs through D2D coordinator 115. Although FIG. 1 illustrates several scenarios that involve the use of a D2D coordinator, it should be understood that communication between devices may be performed without any D2D coordinator, directly under the control of an eNB, such as eNB 102 or pico eNB 112. A similar configuration is present in D2D cluster 120, between dUE 126 and dUE 127, except there is no D2D coordinator in D2D cluster 120. It should be understood that there is a connection between D2D coordinator 115 and dUEs 116 and 117, it is merely omitted from FIG. 1.

D2D cluster 130 comprises D2D coordinator 135, dUE 136, and dUE 137. In D2D cluster 130, dUEs 136 and 137 may communicate directly with each other and with D2D controller 135. D2D coordinator 135 serves to control the D2D connection between dUE 136 and dUE 137. D2D 135 may also organize multicast/broadcast transmissions with dUE 136 or dUE 137. As above, dUEs 136 and 137 and D2D coordinator 135 free up the bandwidth of eNB 102 by using the same space as a single traditional UE. Unlike D2D clusters 110 and 120, there is no pico eNB coupled to D2D cluster 130.

D2D cluster 140 comprises pico eNB 141, dUEs 142 and 143; D2D controller 145; and dUEs 146 and 147, dUEs 142 and 143 are coupled to pico eNB 141, but are not coupled to any other UEs. D2D coordinator 145 is also coupled to pico eNB 142. dUEs 146 and 147 are in a multi-hop configuration-only dUE 146 is coupled to D2D controller 145. If pico eNB wants to send data to dUE 146 it can send the data through D2D coordinator/controller dUE 145. If D2D controller needs to send a signal to dUE 147, the signal is transmitted first to dUE 146.

D2D cluster 150 comprises dUEs 152, 154, 156, and 158 coupled to each other in a mesh configuration, with each of the dUEs 152, 154, 156, and 158 coupled to each other as illustrated. If a dUE needs to send data to a dUE it is not directly coupled to (e.g., dUEs 152 and 156), it can send the data through a dUE that it is connected to (e.g., dUE 154). As with all connections illustrated in FIG. 1, a D2D controller is not necessary.

With D2D clusters 110, 120, 130, 140, and 150 each operating independently, eNB 102 does not have to handle as much traffic, thereby allowing eNB 102 to service more UEs than would otherwise be possible and/or provide higher throughput to other UEs. However, the presence of multiple D2D clusters could result in an increase in inter-cell interference.

D2D communication is possible in both licensed and unlicensed bands. For example, D2D communication between dUE1 and dUE2 may be accomplished via LTE signals. In such a situation, dUE1 and dUE2 would use the same frequencies and transmission schemes for D2D communication as it does for LTE communications via the eNB. D2D communication between dUE1 and dUE2 may also be accomplished via WiFi signals in a process called offloading. In an offloading situation, the D2D communication may be performed, for example, via WiFi signals, resulting in several benefits.

For example, there may be less interference with other LTE signals because WiFi signals are at a different frequency. In addition, more bandwidth may be available for data transmission in WiFi bands, so that higher data transmission rates can be achieved for short-distance D2D communication. The contention-based channel access mechanism adopted in WiFi is appropriate to accommodate multiple D2D transmissions in a local area. Moreover, WiFi has become a very common component on the mobile devices available today, making it easier to implement on offloading scheme.

WiFi signals may be in a variety of different frequencies. Three distinct frequency ranges being used currently are centered around 2.4 GHz, 5.2 GHz, and 5.8 GHz (it should be noted that sometimes the 5.2 GHz and 5.8 GHz bands are collectively referred to as the 5 GHz band). Other frequencies may be used in the future, such as 3.6 GHz and 60 GHz. In order for one dUE to communicate to another dUE, the capabilities of both devices must be determined. For example, some devices can only transmit at certain frequency ranges. In addition, it must be determined if there are any clean (i.e., unused) channels that all the dUEs can work on. One method of finding clean channels is to conduct a complete channel scan. However, a complete channel scan may take a few seconds, which could cause problems for cellular D2D communication with Quality of Service (QoS) requirements. In addition, a complete power scan may use more power than needed, which can detrimentally affect battery life. In those situations, the few second delay would be unacceptable. It would be desirable to shorten the time and save the power consumption needed to perform a scan.

In addition to WiFi, D2D communication can use other unlicensed bands, such as Bluetooth, Zigbee, and modified LTE technology. Since each dUE may not support all the technologies, a common set of technologies and a common set of operational frequencies needs to be identified before establishing a connection using those bands.

One method that could be used to shorten the time needed to perform a scan is to use the devices that will take part in the D2D communications to collaborate with the channel scan. The eNB may identify the common set of technologies and frequency bands for the D2D devices. This may include requesting a capability report from each device and finding a common set of capabilities. Thereafter, the eNB may divide the common set of capabilities and ask each dUE to scan a portion of the common set for interference measurements.

Figure 2:
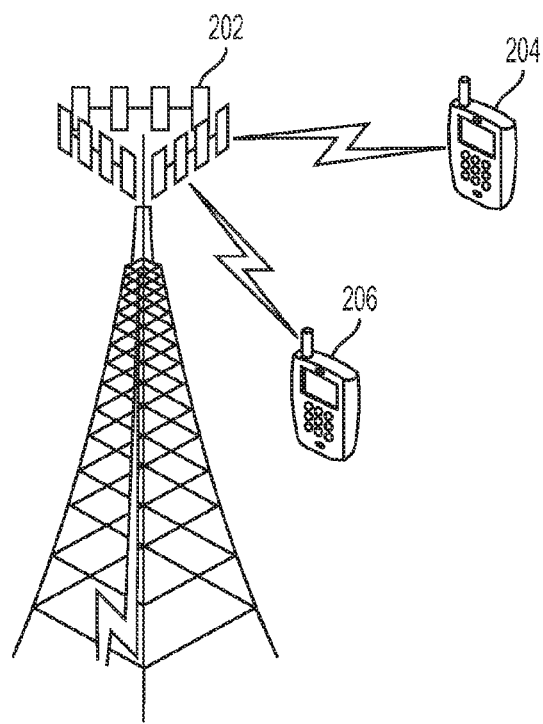
FIG. 2 is another overview of an embodiment.

With reference to FIG. 2, a simplified version of the diagram of FIG. 1 is presented. An eNB 202 is pictured coupled to two UEs, a dUE1 204 and a dUE2 206. Before the D2D connection is established between dUE1 204 and dUE2 206, eNB 202 may ask dUE1 204 and dUE2 206 to measure ail available WiFi channels.

For example, dUE1 and dUE2 may both be able to communicate in the 2.4 GFIz WiFi band. In North America, the 2.4 GHz WiFi band has 11 channels available (with more channels available in other countries). eNB 202 may task dUE1 204 to measure the interference present in channels 1 through 6 and task dUE2 to measure the interference present in channels 7 through 11. Distributing the channel scan between dUE1 and dUE2 shortens the time needed to conduct a channel scan and lessens the power used to conduct the power scan. Thereafter, both dUE1 204 and dUE2 206 transmit the results to eNB 202, which can then determine the best channel for dUE1 204 and dUE2 206 to use for D2D communications.

Figure 3:
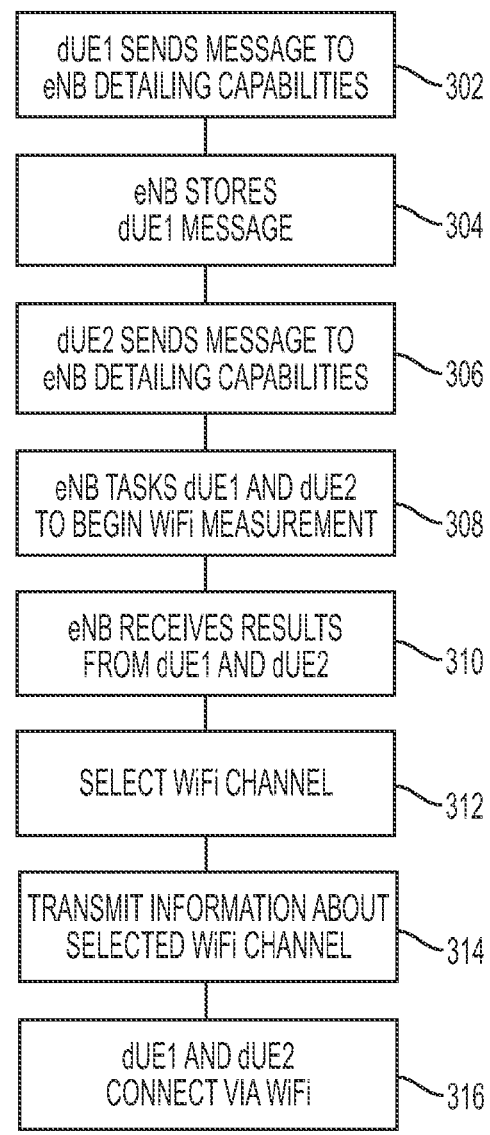
FIG. 3 is a flowchart showing the operation of an embodiment.

With reference to FIG. 3, a flowchart detailing the operation of an embodiment is presented. A dUE1 sends an RRC message or other control message to the eNB, detailing the D2D capabilities of dUE1 (302). The D2D capabilities may include: 1) supported D2D technologies, e.g., LTE D2D, WiFi D2D, and the like; and 2) frequency band, PHY parameters, supported radio technology, Quality of Service (QoS) parameters, power capacity, and the like, such that the eNB or D2D devices can select proper technologies for a D2D communication. During the establishment of the D2D connection, the eNB can help make the selection from a set of supported technologies and parameters reported from the D2D devices, or the eNB can select the common set of technologies and parameters for multiple D2D devices and then let D2D devices make the selection.

The eNB stores the D2D capabilities of dUE1 (304). When dUE2 connects to the eNB, dUE2 sends an RRC message or other control message to the eNB, detailing the D2D capabilities of dUE2, which the eNB then stores (306). These procedures of dUE1 and dUE2 sending a message to the eNB may be part of a standard protocol that is to be performed whenever a UE connects to the eNB.

Thereafter, if dUE1 and dUE2 desire to connect in a D2D mode, the eNB retrieves the capabilities of both dUE1 and dUE2 from memory. The eNB tasks dUE1 and dUE2 to begin a WiFi measurement process (308). As described above, each of dUE1 and dUE2 is tasked to measure only a portion of the available WiFi channels. From 302 and 306, it is determined what WiFi channels are commonly available to both dUE1 and dUE2. The WiFi channels are divided into two subsets. For example, if channels 1 through 11 are available in the 2.4 GHz band, dUE1 may be tasked to measure channels 1 through 6 while dUE2 is tasked to measure channels 7 through 11. It should be understood that the permutations of the portions being measured by each dUE is not limited. dUE1 and dUE2 then transmit the results to the eNB (310). Based on the channel quality and interference status, the eNB selects an appropriate WiFi channel to be used for the D2D connection between dUE1 and dUE2 (312). This may be based on a variety of criteria, such as signal strength, interference, and the like. For example, interference strength can be evaluated via the received signal strength level and/or the percentage of occupation (the usage of a channel by other devices).

Then the eNB transmits the information regarding the selected WiFi channel to dUE1 and dUE 2 (314). dUE1 and dUE2 can then proceed with the handshaking procedures needed to connect via the selected WiFi channel (316). The handshaking between dUE1 and dUE2 can take place in a manner typical for WiFi handshaking.

It should be understood that more than two dUEs can be used in an embodiment. For example, three dUEs may be used with dUE1 measuring channels 1 through 4, dUE2 measuring channels 5 through 8, and dUE3 measuring channels 9 through 11. It should be further understood that embodiments are not limited to the 2.4 GHz band of WiFi. If the dUEs are capable of using both the 2.4 GHz band of WiFi and other bands, such as the 5.2 GHz band or the 5.8 GHz band, channels in both bands may be measured by the dUEs. For example, dUE1 can measure channels in the 2.4 GHz band while dUE2 measures channels in the 5 GHz band. Thereafter, the results are compared by the eNB, which can then determine which channel should be used for the D2D communication.

The following examples pertain to further embodiments.

In one embodiment, an evolved Node B (eNB) may comprise processing circuitry to directly couple a first user equipment (dUE1) to a second user equipment (dUE2) in a device-to-device (D2D) configuration. The circuitry may be arranged to: receive a first control message from the dUE1; receive a second control message from the dUE2; receive a request for the dUE1 and the dUE2 to communicate in a device-to-device mode via WiFi signals; determining common D2D features between the dUE1 and the dUE2; determining a preferred connection method between dUE1 and dUE2; and directing the dUE1 and the dUE2 to use the preferred connection method to establish a D2D connection between the dUE1 and the dUE2.

In one embodiment, the first control message comprises information regarding the D2D capabilities of the dUE1; and the second control message comprises information regarding the D2D capabilities of the dUE2.

In one embodiment, the information regarding D2D capabilities of the dUE1 includes one or more of the following: supported physical layer technologies, supported frequency bands, supported radio technology, Quality of Service Parameters, and power capacity; and the information regarding D2D capabilities of the dUE2 includes one or more of the following: supported physical layer technologies, supported frequency bands, supported radio technology, Quality of Service Parameters, and power capacity.

In one embodiment, the information regarding the D2D capabilities of the dUE1 includes information regarding the WiFi channels the dUE1 is capable of using; and wherein the information regarding the D2D capabilities of the dUE2 includes information regarding the WiFi channels the dUE2 is capable of using.

In one embodiment, the processing circuitry is further arranged to: determine a common set of WiFi channels that the dUE1 and the dUE2 are both capable of using; separate the common set of WiFi channels into a first subset of WiFi channels and a second subset of WiFi channels; direct the dUE1 to measure a first subset of WiFi channels; direct the dUE2 to measure a second subset of WiFi channels; receive measurements regarding the first subset of WiFi channels from dUE1; receive measurements regarding the second subset of WiFi channels from dUE2; and assign a WiFi channel to be used by the dUE1 and the dUE2 for device-to-device communications based on the measurements regarding the first subset of WiFi channels and the second subset of WiFi channels.

In one embodiment, the first control message is a Radio Resource Control (RRC) message; and wherein the second control message is a Radio Resource Control (RRC) message.

In one embodiment, the first control message comprises supported D2D technologies and parameters; and the second control message comprises supported D2D technologies and parameters.

In another embodiment, a method for establishing a device to device (D2D) connection may comprise: receiving a first control message from a first user equipment (UE); receiving a second control message from a second UE; receiving a request to establish a D2D connection between the first UE and the second UE; determining the available WiFi channels from the first control message and the second control message; instructing the first UE and the second UE to perform a distributed channel scan; and assigning a preferred WiFi channel to be used for the D2D connection between the first UE and the second UE based on the distributed channel scan.

In one embodiment, instructing the first UE and the second UE to perform a distributed channel scan comprises: separating the available set of WiFi channels into a first subset of WiFi channels and a second subset of WiFi channels; tasking the first UE to measure the first subset of available WiFi channels and transmit the measurements; tasking the second UE measure the second subset of available WiFi channels and transmit the measurements; receiving the measurements of the first and second subsets of available WiFi channels from the first and second UE; and evaluating the measurements of the first and second subsets of available WiFi channels to select a preferred WiFi channel.

In one embodiment, the measurements of the first subset of available WiFi channels include signal strength and interference levels of each channel in the first subset of available WiFi channels; and the measurements of the second subset of available WiFi channels include signal strength and interference levels of each channel in the second subset of available WiFi channels.

In one embodiment, the measurements of the first subset of available WiFi channels include a percentage of occupation of each channel in the first subset of available WiFi channels; and the measurements of the second subset of available WiFi channels include a percentage of occupation of each channel in the second subset of available WiFi channels.

In one embodiment, the first message from the first UE comprises information regarding the WiFi capabilities of the first UE; and further wherein the second message from the second UE comprises information regarding the WiFi capabilities of the second UE.

In one embodiment, the first control message is a Radio Resource Control (RRC) message; and wherein the second control message is a Radio Resource Control (RRC) message.

In one embodiment, the first control message comprises supported D2D technologies and parameters; and the second control message comprises supported D2D technologies and parameters.

In one embodiment, the method is performed by an evolved Node B (eNB) operating in a Long Term Evolution (LTE) network.

In another embodiment, a method performed by a first user equipment for connecting a first user equipment (UE) with a second UE using a device to device (D2D) connection may comprise: sending a control message to an evolved Node B (eNB); requesting a D2D connection between the first UE and the second UE; receiving instructions from the eNB to measure a subset of available WiFi channels; conducting a channel scan of the subset of available WiFi channels; sending the results of the channel scan to the eNB; and receiving instructions on WiFi settings to be used in a D2D connection.

In one embodiment, the method may further comprise: establishing a connection between the first UE and the second LIE using the instructions on WiFi settings.

In one embodiment, the control message comprises information regarding the D2D capabilities of the first UE.

In one embodiment, the information regarding the D2D capabilities of the first UE includes information regarding the WiFi channels the first UE is capable of using.

In one embodiment, the control message is a Radio Resource Control (RRC) message.

In one embodiment, the control message comprises supported D2D technologies and parameters.

In one embodiment, the method may further comprise establishing a D2D connection with the second UE.

In another embodiment, a method for negotiating a device to device (D2D) connection in a Long Term Evolution (LTE) network may comprise: receiving a first control message from a first user equipment (UE); receiving a second control message from a second UE; receiving a request to establish a D2D connection between the first UE and the second UE; determining the common capabilities of the first UE and the second UE based on the first control message and the second control message; and assigning a D2D connection based on the common capabilities.

In one embodiment, the first control message comprises D2D capability information of the first UE; and the second control message comprises D2D capability information of the second UE.

In one embodiment, the D2D capability information of the first UE includes one or more of the following: supported physical layer technologies, supported frequency bands, supported radio technology, Quality of Service Parameters, and power capacity of the first LIE; and further wherein the D2D capability information of the first LIE includes one or more of the following: supported physical layer technologies, supported frequency bands, supported radio technology, Quality of Service Parameters, and power capacity of the second UE.

In one embodiment, assigning a D2D connection based on the common capabilities comprises evaluating the D2D capability information of the first UE and the D2D capability information of the second UE.

In one embodiment, the first control message comprises supported D2D technologies and parameters; and the second control message comprises supported D2D technologies and parameters.

While certain features of the invention have been illustrated and described herein, many modifications, substitutions, changes, and equivalents may occur to those skilled in the art. It is, therefore, to be understood that the appended claims are intended to cover all such modifications and changes as fall within the scope of the invention.

We claim:

1. An evolved Node B (eNB) comprising processing circuitry to directly couple a first user equipment (dUE1) to a second user equipment (dUE2) in a device-to-device (D2D) configuration, said circuitry arranged to:
receive a first control message from the dUE1;
receive a second control message from the dUE2;
receive a request for the dUE1 and the dUE2 to communicate in a device-to-device mode via WiFi signals;
determine common D2D features between the dUE1 and the dUE2;
determine a preferred connection method between the dUE1 and the dUE2;
determine a common set of WiFi channels that the dUE1 and the dUE2 are both capable of using;
separate the common set of WiFi channels into a first subset of WiFi channels and a second subset of WiFi channels;
direct the dUE1 to measure the first subset of WiFi channels;
direct the dUE2 to measure the second subset of WiFi channels;
receive measurements regarding the first subset of WiFi channels from the dUE1;
receive measurements regarding the second subset of WiFi channels from the dUE2; and
assign a WiFi channel to be used by the dUE1 and the dUE2 for device-to-device communications based on the measurements regarding the first subset of WiFi channels and the second subset of WiFi channels; and
direct the dUE1 and the dUE2 to use the preferred connection method to establish a D2D connection between the dUE1 and the dUE2.

2. The eNB of claim 1 wherein said first control message comprises information regarding D2D capabilities of the dUE1; and
said second control message comprises information regarding D2D capabilities of the dUE2.

3. The eNB of claim 2 wherein:
the information regarding D2D capabilities of the dUE1 includes one or more of the following: supported physical layer technologies, supported frequency bands, supported radio technology, Quality of Service Parameters, and power capacity of the dUE1;
and the information regarding D2D capabilities of the dUE2 includes one or more of the following: supported physical layer technologies, supported frequency bands, supported radio technology, Quality of Service Parameters, and power capacity of the dUE2.

4. The evolved Node B of claim 2 wherein the information regarding the D2D capabilities of the dUE1 includes information regarding which WiFi channels the dUE1 is capable of using; and
wherein the information regarding the D2D capabilities of the dUE2 includes information regarding which WiFi channels the dUE2 is capable of using.

5. The evolved Node B of claim 1 wherein the first control message is a Radio Resource Control (RRC) message; and
wherein the second control message is a Radio Resource Control (RRC) message.

6. The evolved Node B of claim 5 wherein:
the first control message comprises a list of supported D2D technologies and parameters; and
the second control message comprises a list of supported D2D technologies and parameters.

7. A method for establishing a device to device (D2D) connection comprising:
receiving a first control message from a first user equipment (UE);
receiving a second control message from a second UE;
receiving a request to establish a D2D connection between the first UE and the second UE;
determining a set of available WiFi channels from the first control message and the second control message;
instructing the first UE and the second UE to perform a distributed channel scan, wherein instructing the first UE and the second UE to perform a distributed channel scan comprises separating the set of available set of WiFi channels into a first subset of WiFi channels and a second subset of WiFi channels;
tasking the first UE to measure the first subset of available WiFi channels and transmit the measurements of the first subset of available WiFi channels;
tasking the second UE measure the second subset of available WiFi channels and transmit the measurements of the second subset of available WiFi channels;
receiving the measurements of the first and second subsets of available WiFi channels from the first and second UEs; and
evaluating the measurements of the first and second subsets of available WiFi channels to select the preferred WiFi channel; and
assigning a preferred WiFi channel to be used for the D2D connection between the first UE and the second UE based on the distributed channel scan.

8. The method of claim 7 wherein the measurements of the first subset of available WiFi channels include signal strength and interference levels of each channel in the first subset of available WiFi channels; and
the measurements of the second subset of available WiFi channels include signal strength and interference levels of each channel in the second subset of available WiFi channels.

9. The method of claim 7 wherein the measurements of the first subset of available WiFi channels include a percentage of occupation of each channel in the first subset of available WiFi channels; and
the measurements of the second subset of available WiFi channels include a percentage of occupation of each channel in the second subset of available WiFi channels.

10. The method of claim 7 wherein the first control message from the first UE comprises information regarding WiFi capabilities of the first UE; and
further wherein the second control message from the second UE comprises information regarding WiFi capabilities of the second UE.

11. The method of claim 7 wherein:
the first control message is a Radio Resource Control (RRC) message; and
wherein the second control message is a Radio Resource Control (RRC) message.

12. The method of claim 11 wherein:
the first control message comprises a list of supported D2D technologies and parameters of the first UE; and
the second control message comprises a list of supported D2D technologies and parameters of the second UE.

13. The method of claim 7 wherein the method is performed by an evolved Node B (eNB) operating in a Long Term Evolution (LTE) network.

14. A method performed by a first user equipment for connecting the first user equipment (UE) with a second UE using a device to device (D2D) connection comprising:
  sending a control message to an evolved Node B (eNB);
  requesting a D2D connection between the first UE and the second UE;
    receiving instructions from the eNB to measure a subset of available WiFi channels;
    conducting a channel scan of the subset of available WiFi channels;
  sending results of the channel scan to the eNB; and
  receiving instructions comprising WiFi settings to be used in a D2D connection.

15. The method of claim 14 further comprising:
  establishing a connection between the first UE and the second UE using the instructions comprising WiFi settings.

16. The method of claim 14 wherein the control message comprises information regarding D2D capabilities of the first UE.

17. The method of claim 16 wherein the information regarding the D2D capabilities of the first UE includes information regarding WiFi channels that the first UE is capable of using.

18. The method of claim 16 wherein the control message is a Radio Resource Control (RRC) message.

19. The method of claim 18 wherein the control message comprises supported D2D technologies and parameters.

20. The method of claim 14 further comprising establishing a D2D connection with the second UE.

21. A method for negotiating a device to device (D2D) connection in a Long Term Evolution (LTE) network comprising:
  receiving a first control message from a first user equipment (UE);
  receiving a second control message from a second UE;
  receiving a request to establish a D2D connection between the first UE and the second UE;
  determining common capabilities of the first UE and the second UE based on the first control message and the second control message;
  directing the first UE and the second UE to measure a first subset and a second subset, respectively, of resources over which a D2D connection can be assigned;
  receiving a measurement report from the first UE and the second UE corresponding to the different subsets of resources; and
  assigning the D2D connection based on the common capabilities and on the measurement report.

22. The method of claim 21 wherein:
  the first control message comprises D2D capability information of the first UE; and
  the second control message comprises D2D capability information of the second UE.

23. The method of claim 22 wherein:
  the D2D capability information of the first UE includes one or more of the following:
supported physical layer technologies, supported frequency bands, supported radio technology, Quality of Service Parameters, and power capacity of the first UE; and
  further wherein the D2D capability information of the first UE includes one or more of the following: supported physical layer technologies, supported frequency bands, supported radio technology, Quality of Service Parameters, and power capacity of the second UE.

24. The method of claim 23 wherein assigning a D2D connection based on the common capabilities comprises evaluating the D2D capability information of the first UE and the D2D capability information of the second UE.

25. The method of claim 21 wherein
  the first control message comprises supported D2D technologies and parameters; and
the second control message comprises supported D2D technologies and parameters.

* * * * *